April 7, 1931.         L. H. CHURCH         1,799,783
CABLE CONNECTER
Filed April 30, 1926
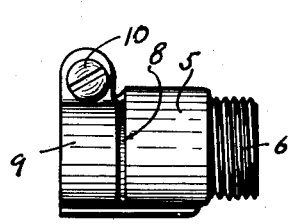
Fig.1
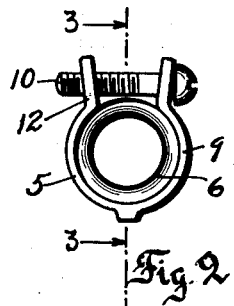
Fig.2
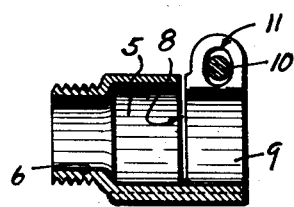
Fig.3
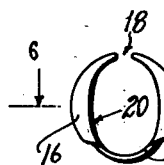
Fig.4
Fig.5
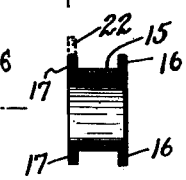
Fig.6
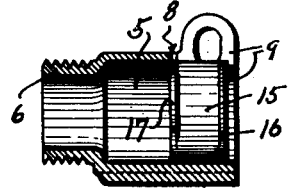
Fig.7
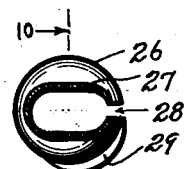
Fig.8
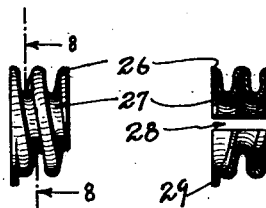
Fig.9
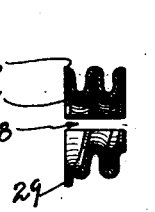
Fig.10
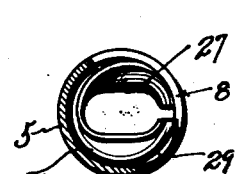
Fig.11
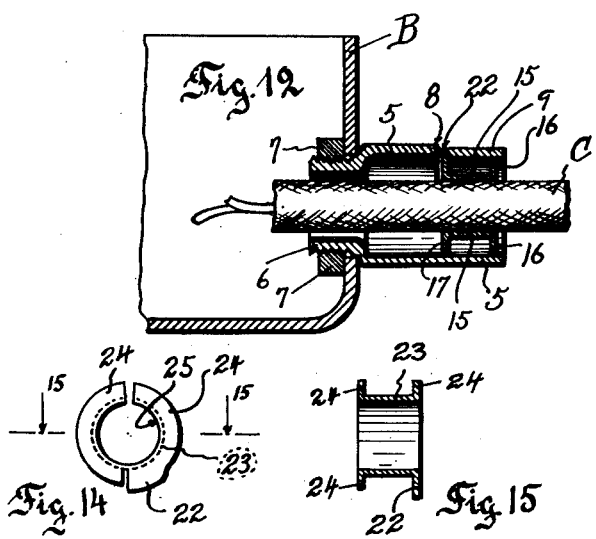
Fig.12
Fig.14
Fig.15
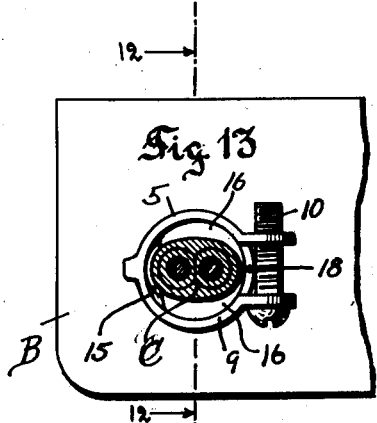
Fig.13
INVENTOR
Lewis H. Church
BY
Bohleber + Ledbetter
ATTORNEYS Patented Apr. 7, 1931

1,799,783

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed April 30, 1926. Serial No. 105,672.

This invention relates to cable connecters and particularly to adapting connecters capable of universally anchoring all sizes and shapes, flat or round, large or small, cable to electric fixture boxes.

A primary object of the invention is to produce a size and shape reducing adapter insert for use in connection with cable connecters by which a connecter, for example, a squeeze-type connecter, may be converted for use with small size cable, or converted for use with oval or flat cable.

A further object of the invention is to produce a cable size and shape reducer or insert for connecters capable of the uses above expressed without removing the cable clamping screw from the connecter, which is to say that the connecter forming the subject of this invention may have its adapter insert quickly removed or placed in position without taking out the screw.

A further object of the invention is to produce a size and shape reducing cable adapter insert which positively anchors itself in a squeeze-type sleeve connecter without necessarily being connected to the cable clamp screw and at the same time is positively secured in the sleeve connecter.

A further object of the invention is to produce a size reducing sleeve adapter capable of transforming a large size ordinary squeeze type connecter ordinarily used with round cable to a connecter for use with small size oval shape cable. In other words, I make a small squeeze connecter from a large one, and vice versa.

Further objects of the invention will be understood from the specification to follow which describes several examples of the invention which are shown in the accompanying drawings, wherein:

The first three views illustrate one well-known type of squeeze connecter which is satisfactory for use in constructing cable connecters in accordance with this invention.

Figures 1 and 2 respectively show side and end elevations of the squeeze connecter, while Figure 3 is a longitudinal section on the line 3—3 of Figure 2.

Figures 4, 5 and 6 illustrate detailed views of the size and shape reducing adapter insert, the first two views being end and side elevations respectively, while Figure 6 is a section on the line 6—6 of the former views.

Figure 7 is a longitudinal sectional view of the adapter insert mounted within the squeeze connecter, the adapter insert itself being shown in elevation.

Figures 8, 9 and 10 illustrate a modified form of the adapter insert by way of corrugated adapter sleeve, Figure 8 being a section on the line 8—8, Figure 9 a side elevation, and Figure 10 being a longitudinal section on the line 10—10.

Figure 11 is a cross-sectional view through a squeeze type sleeve connecter with the corrugated insert placed therein.

Figure 12 shows an assembly longitudinal section of the connecter and box with the size reducing insert mounted in a squeeze sleeve connecter securing a small size oval cable to the box; and Figure 13 shows an outside end elevation thereof.

Figures 14 and 15 illustrate modified forms of a shape and size sleeve reducer for small round cable, i. e. for reducing a large size connecter to small round cable size uses.

Referring further to the drawing for a description of the invention, my improved size and shape adapter insert may be used in connection with various type sleeve connecters. It is primarily designed to transform a connecter ordinarily for large cable to one particularly useful with small cable. The cable connecter shown in Figures 1, 2 and 3 may be referred to as a squeeze connecter. It comprises a sleeve 5 provided with any suitable box hole anchorage means such as a threaded sleeve end 6 provided with a nut 7, or other means for anchoring it in a box hole may be used.

The sleeve 5 is split as at 8, a radial split being preferred for this purpose, thus forming a cable clamp strap 9 having more or less flexibility of movement or capable of radial bending motion and capable of contraction to clamp large size cable, not shown, in the sleeve 5. A clamp screw 10 passes through a large hole 11 and threads into a threaded ear 12. The screw draws down on the strap 9 thereby clamping it upon a large size cable placed in the sleeve 5. The clamp strap 9 also performs the purpose of clamping in the size and shape reducing insert forming a part of this invention, as will be seen. The radial split 8 forms the flexible or bendable clamp strap 9 and is also utilized as anchorage means by which the adapter insert is positively held in the sleeve 5. The particular sleeve connecter disclosed is therefore so constructed that it is full-fashioned or rigid at one end and is split and contractible at the other end.

Referring now to Figures 4, 5 and 6, there is shown the size and shape reducing adapter insert in the form of a longitudinal split sleeve, the internal shape of which may be round, as in Figures 14 and 15, or oval as desired. An oval shaped insert is here shown so as to conform to the oval shape cable C shown in the assembly views Figures 12 and 13. The adapter sleeve fits within the squeeze type connecter and means is provided for spacing it centrally within the larger sleeve connecter, for closing the annular space around the cable in the connecter, and for transmitting the clamping action of the screw and strap to the adapter and thus contracting or squeezing it against a small cable.

The reducing adapter insert consists of a sleeve 15 with turned up or outwardly directed edge or edges or flanges 16 and 17 on each end thereof. The sleeve 15 is pressed into suitable shape with its ends upset to form the ribs or flanges 16 and 17 the periphery of which seat or rest against the inside of the sleeve connecter 5—9. In this way the up-set edges 16 and 17 on the reducing sleeve 15 close the annular space existing between the adapter sleeve wall 15 and outer large sleeve wall of the squeeze connecter. Furthermore, the up-set radial flanges 16 and 17 being spaced apart brace the smaller sleeve 15 in the larger sleeve and prevent wobbling of the smaller part in the larger part when strain is exerted on the cable. The adapter sleeve 15 is necessarily contractible and therefore may be longitudinally split at 18 which enables it to expand and receive the cable and thereafter to contract and clamp around the cable.

In view of the fact that the adapter insert illustrated herewith is designed to receive oval cable, it follows that the internal surface 20 is oval while the periphery of the edges or flanges 16 and 17 are circular and are tapered from their circular periphery down to the oval sleeve. One up-set edge 22 may be made deeper than the other edges and placed in registry with the radial slot 8 of the sleeve connecter 5, which is to say that the edge 22 on one end of the adapter sleeve 15 projects into the slot 8 as noted in Figure 12. In this way the adapter insert 15 is positively anchored in positon, especially so after the clamp strap 9 is drawn down on the small inside sleeve 15 by running the screw 10 into clamping position.

It is obvious that the adapter sleeve 15 may be knocked out of the sleeve connecter 15 by a screw driver or other tool, especially so by slightly loosening up the screw 10. In this way the mechanic on the job, while ordinarily using these connecters for small size cable C, may knock the insert out and use the large size squeeze connecter 5 for steel armored cable. This is a decided advantage for the same connecter is useful for several different requirements. Furthermore the mechanic is not handicapped in removing the clamp screw 10 for he may be working in inaccessible and uncomfortable positions where it is inconvenient to take out screws.

Referring now to Figures 14 and 15 there is shown a size reducing adapter insert 23 provided with end flanges 24 which fit against the inside cylindrical surface of the connecter. One end of this sleeve insert 23 may carry a rather deep flange or upturned edge 22 which projects through the slot 8 as shown at Figure 12. Furthermore, the upturned ends 24 and 24 serve the additional purpose of closing the annular space around the cable which otherwise would remain between the adapter sleeve and connecter. Figures 14 and 15 clearly show how the circular edged insert may have a cylindrical center 25 for round cable differentiating in this detailed respect from the oval center 20 of the adapter sleeve already described.

Referring now to Figures 8 to 11 for an explanation of a modified form of the invention, there is shown a corrugated reducing insert having externally pressed corrugations 26 defining deeply pressed grooves 27. The perimeter 26 of the adapter insert is circular to conform to the inside circle of sleeve 5 and strap 9 of the squeeze connecter while the inside shape 27 may be round or oval to conform to the shape of the cable C. This adapter insert is longitudinally split at 28 to permit it to contract and expand under the action of the cable clamp strap 9 in a manner similar to the action of the adapter insert heretofore described. It may be provided a protruding flange or lip 29 which projects into the slit 8 of the sleeve 5 as noted in Figure 11.

In using this improved adapting connecter, the connecter 5 and the adapter parts 15, 23 or 26 may be carried separately and assembled when the mechanic makes ready to use small cable or they may preferably be assembled at the factory. At any rate this connecter is useful on large size cable and small size cable whether or not armored. In anchoring a small cable C to the box B, the screw 10 is loosened which permits the adapter sleeve to expand thus receiving the cable C. The screw 10 is now run down bringing the strap 9 to bear on the adapter sleeve 15 which compresses it around cable C. The adapter anchorage flange or lip 22 or 29 can be made to project into the connecter slit 8 to positively secure the adapter and cable from displacement.

The upturned edges or flanges 16 and 17 of the sleeve adapter 15, as well as the corrugations 26, performs several purposes, namely, that of transmitting the pressure of the cable clamp strap 9 directly to cable C thus embedding the adapter into the wall of the cable, as well as closing the space about the cable between the adapter and connecter, and the longer or deeper edge, when necessary to use it, fits into the slit 8 to fix all parts against longitudinal displacement.

When the cable clamp screw 10 is turned to draw in on the clamp strap 9, it follows that a shoulder forms in the sleeve 5 at the inner edge of the clamp sleeve which shoulder is in effect defined by the slit 8 and said inner edge of the clamp strap. This shoulder, as noted in Figure 12, or in fact the radial edge of the strap 9 works down over the radial edge 16 or 17 so that one upturned portion or end of the adapter member hooks behind the strap edge shoulder and the other upturned portion bears directly against the wall of the strap. The clamp strap therefore transmits force through an upturned portion to squeeze the adapter on a cable, while the upturned flanged end behind the strap in the slit 8 fixes the adapter and cable against lengthwise displacement.

The several types of reducer inserts 15, 26, and 23, or other shapes, afford a small size cable passage 20, 27 and 25, together with a large size periphery 16, 26 and 24. The peripheral portions afford means, standing out from the cable passage, to engage the inner cylindrical wall of the connecter sleeve.

What I claim is:

1. An adapting cable connecter comprising, a connecter including box hole anchorage means, a contractible reducing member including a small size cable passage and means standing out therefrom engaging the inside wall of the connecter to hold the member and connecter in spaced relation, and cable clamping means carried on the connecter bearing against the means standing out from the small size cable passage to clamp the reducing member against a cable.

2. An adapting cable connecter comprising, a connecter including box hole anchorage means and large size cable clamping means, a small cable size adapting contractible member mounted in the connecter with outwardly-directed spaced apart portions engaging the internal wall of the connecter to brace it therein, and means included in the aforesaid clamping means to clamp the adapting member against small size cable.

3. An adapting cable connecter comprising, a sleeve connecter having a slit, a bendable clamp strap adjacent the slit, a screw acting on the clamp strap, and a contractible reducing member including an outwardly-directed portion the outer edge of which rests against the inside surface of the clamp strap and transmits pressure therefrom to the reducing member.

4. An adapting cable connecter comprising, a sleeve connecter having a slit, a bendable clamp strap adjacent the slit, a screw acting on the clamp strap, a reducing member including an outwardly-directed portion the outer edge of which rests against the inside surface of the clamp strap and transmits pressure therefrom to the reducing member, and another outwardly-directed portion on the reducing member spaced from the first outwardly-directed portion and fitting behind the edge of the clamp strap in line with the split.

5. An adapting cable connecter comprising, a large size sleeve connecter including box hole anchorage means and provided with a split forming a bendable clamp strap, a small longitudinally split adapter sleeve mounted in the large sleeve and open space being left between the two sleeves by reason of the difference in sizes; and means placed in the open space between the split sleeve and longitudinally split sleeve to close the space, to transmit pressure from the clamp strap to the adapter sleeve, and to hold it in the sleeve connecter.

6. An adapting cable connecter comprising, a cable receiving connecter including box hole anchorage means and cable clamping means to make a complete large cable size connecter in itself; a small contractible sleeve mounted centrally in the connecter leaving an annular space between the sleeve and connecter, and an annularly extending means cooperating with the connecter to close the aforesaid annular space, said cable clamping means contracting the small sleeve on a small cable received therein.

7. A connecter as defined in claim 6 but characterized by the fact that the said annularly extending means cooperates with the cable clamping means of the large size connecter to effect contraction of the small sleeve.

8. A cable connecter combining therewith adapter means to secure large or small cable in a box hole comprising; a connecter in which a cable is placed, including box hole anchorage means, and cable clamping means; a longitudinally split adapter sleeve mounted in the connecter to reduce the inside size thereof, and means holding the adapter sleeve in spaced relation from the inside wall of the connecter and communicating the action of the clamping means thereto.

9. An adapting cable connecter comprising; a squeeze connecter including a sleeve having a circumferential slit therein forming a flexible clamp strap, a screw mounted on the sleeve clamping the strap against a large cable placed in the sleeve, and including box hole anchorage means; and a longitudinally split reducing sleeve mounted in the squeeze connecter embraced and contracted by the strap on a small cable placed therein.

10. An adapting cable connecter comprising; a squeeze connecter including a sleeve having a slit therein forming a flexible clamp strap, a screw mounted on the sleeve clamping the strap against a large cable placed in the sleeve, and including box hole anchorage means; a longitudinally split reducing sleeve mounted in the squeeze connecter embraced and contracted by the strap on small cable placed therein, and means projecting into the slit to retain the reducing sleeve in the connecter sleeve.

11. An adapting cable connecter comprising; a squeeze connecter including a sleeve provided with a slit forming a clamp strap, a screw mounted on the sleeve clamping the strap against a large cable placed in the sleeve, and box hole anchorage means; a longitudinally split reducing sleeve mounted in the squeeze connecter embraced and contracted by the strap on small cable placed therein, and means interposed between the two sleeves to hold them apart in spaced relation and close the annular space therebetween.

12. A cable connecter combining therewith adapter means to secure large or small cable in a box hole comprising, a connecter in which a cable is placed, including box hole anchorage means, and cable clamping means; a longitudinally split adapter sleeve mounted in the connecter to reduce the inside size thereof, means holding the adapter sleeve in spaced relation from the inside wall of the connecter and communicating the action of the clamping means thereto, and said insert including an up-set portion fitting against the aforesaid cable clamping means.

13. An adapting cable connecter comprising, a connecter sleeve including box hole anchorage means at one end, having a slit at the other end, a radially movable clamp strap on the sleeve adjacent the slit, a screw to draw down the strap, a contractible sleeve adapter placed under the strap and smaller in diameter than the sleeve connecter, and a circumferential flange upturned on the sleeve adapter which closes the annular space between the sleeves.

14. A cable connecter comprising, a sleeve connecter having a circumferential slit forming a clamp strap with a screw to draw down the strap, an adapter sleeve which is slit and having its ends up-set forming flanges spaced apart, and the adapter sleeve being mounted in the sleeve connecter with one flange under the strap and the other in alignment with the slit first named.

15. A cable connecter as defined in claim 14 but distinguished by reason of the fact that the periphery of the adapter sleeve is circular to conform to the shape of the connecter sleeve, while the adapter sleeve itself is oval shape in cross section.

16. A cable connecter comprising, a sleeve connecter having a box hole anchorage and cable clamping means, an oval shaped split sleeve mounted in the cable clamping means of the sleeve connecter, and the oval split sleeve including upturned portions having circular outer flanges which taper down to the sleeve and close in the space between the two sleeves.

17. A connecter as defined in claim 14 wherein the adapter sleeve is corrugated.

18. A cable connecter comprising, a sleeve connecter having box hole anchorage and cable clamping means, a split adapter sleeve radially corrugated and placed in the connecter, the periphery of the corrugations resting against the inside of the connecter, and the grooves of the corrugations defining a reduced inside adapter sleeve cable passage.

In testimony whereof I affix my signature.

LEWIS H. CHURCH.